(12) United States Patent
German et al.

(10) Patent No.: US 9,441,771 B2
(45) Date of Patent: Sep. 13, 2016

(54) PIPE COUPLING DEVICE

(75) Inventors: Mikhail German, Johnston, RI (US); Leo W. Fleury, Jr., N. Smithfield, RI (US)

(73) Assignee: Mueller International, LLC, Atlanta, GA (US)

( * ) Notice: Subject to any disclaimer, the term of this patent is extended or adjusted under 35 U.S.C. 154(b) by 451 days.

(21) Appl. No.: 13/035,788

(22) Filed: Feb. 25, 2011

(65) Prior Publication Data

US 2011/0210543 A1  Sep. 1, 2011

Related U.S. Application Data

(60) Provisional application No. 61/308,549, filed on Feb. 26, 2010.

(51) Int. Cl.
*F16L 21/04* (2006.01)
*F16L 21/00* (2006.01)

(52) U.S. Cl.
CPC .............. *F16L 21/007* (2013.01); *F16L 21/04* (2013.01)

(58) Field of Classification Search
CPC ..... F16L 21/007; F16L 21/035; F16L 21/04; F16L 21/065; F16L 19/025; F16L 19/06; F16L 19/065; F16L 19/08; F16L 19/086; F16L 19/12; F16L 23/02; F16L 23/18
USPC ....... 285/106, 337, 341, 348, 231, 374, 339, 285/342
See application file for complete search history.

(56) References Cited

U.S. PATENT DOCUMENTS

| | | | | |
|---|---|---|---|---|
| 997,076 A | * | 7/1911 | Metosh | 285/106 |
| 2,130,587 A | * | 9/1938 | Kane | 285/288.1 |
| 3,159,414 A | * | 12/1964 | Widman | F16L 21/04 285/348 |
| 3,298,794 A | * | 1/1967 | Mikesell, Jr et al. | 422/242 |
| 4,552,385 A | * | 11/1985 | Peting | F16L 27/10 285/111 |
| 5,803,513 A | * | 9/1998 | Richardson | 285/342 |
| 6,481,762 B1 | * | 11/2002 | Rex et al. | 285/337 |
| 6,974,160 B2 | * | 12/2005 | Jones | F16L 21/04 285/104 |
| 7,354,073 B2 | * | 4/2008 | Sakamoto | 285/113 |
| 7,374,212 B1 | * | 5/2008 | Gretz | 285/382.7 |
| 2002/0121779 A1 | * | 9/2002 | Adams, Jr. | F16L 21/03 285/374 |
| 2002/0163193 A1 | * | 11/2002 | Abuellel | 285/337 |
| 2004/0239114 A1 | * | 12/2004 | Barron et al. | 285/337 |

FOREIGN PATENT DOCUMENTS

GB   2273537 A  *  6/1994  .............. F16L 17/03

* cited by examiner

*Primary Examiner* — James Hewitt
(74) *Attorney, Agent, or Firm* — Taylor English Duma LLP

(57) ABSTRACT

A device for coupling a male piping member to a female piping member includes a compressible sealing gasket and a gripping ring surrounding the male piping member, the gripping ring including at least one gripping member and at least one overlapping surface. An intermediate ring surrounding the male piping member at least partially overlaps an overlapping surface of the gripping ring and communicates with the compressible sealing gasket. A locking ring surrounding the male piping member communicates with the gripping ring, wherein through a tightening connection between the locking ring and the female piping member, the locking ring communicates with the gripping ring forcing the intermediate ring into the compressible sealing gasket to form a seal between the male piping member and the female piping member and subsequently to force the gripping ring to grip the male piping member.

2 Claims, 8 Drawing Sheets

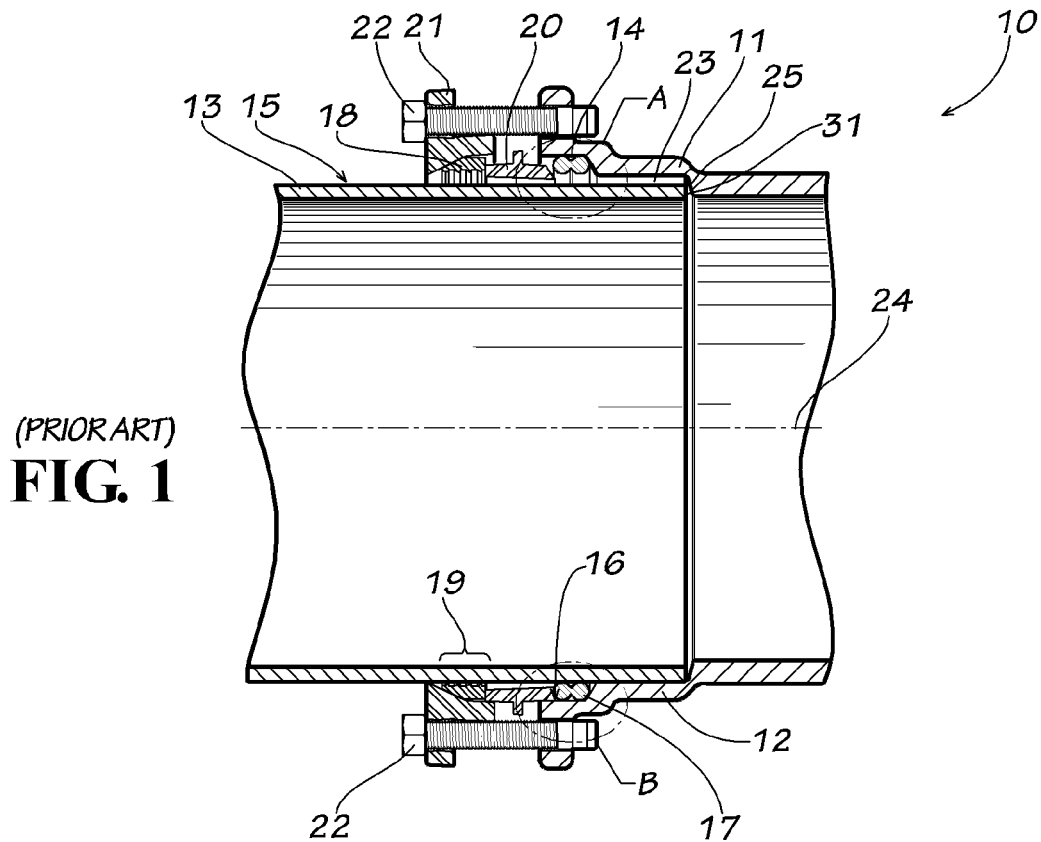
(PRIOR ART)
FIG. 1
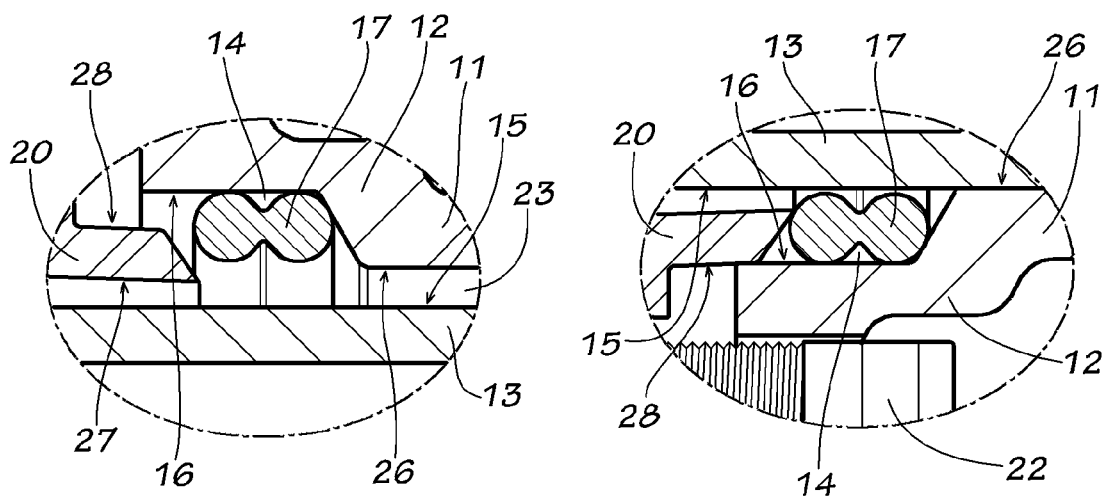
(PRIOR ART)
FIG. 2
(PRIOR ART)
FIG. 3

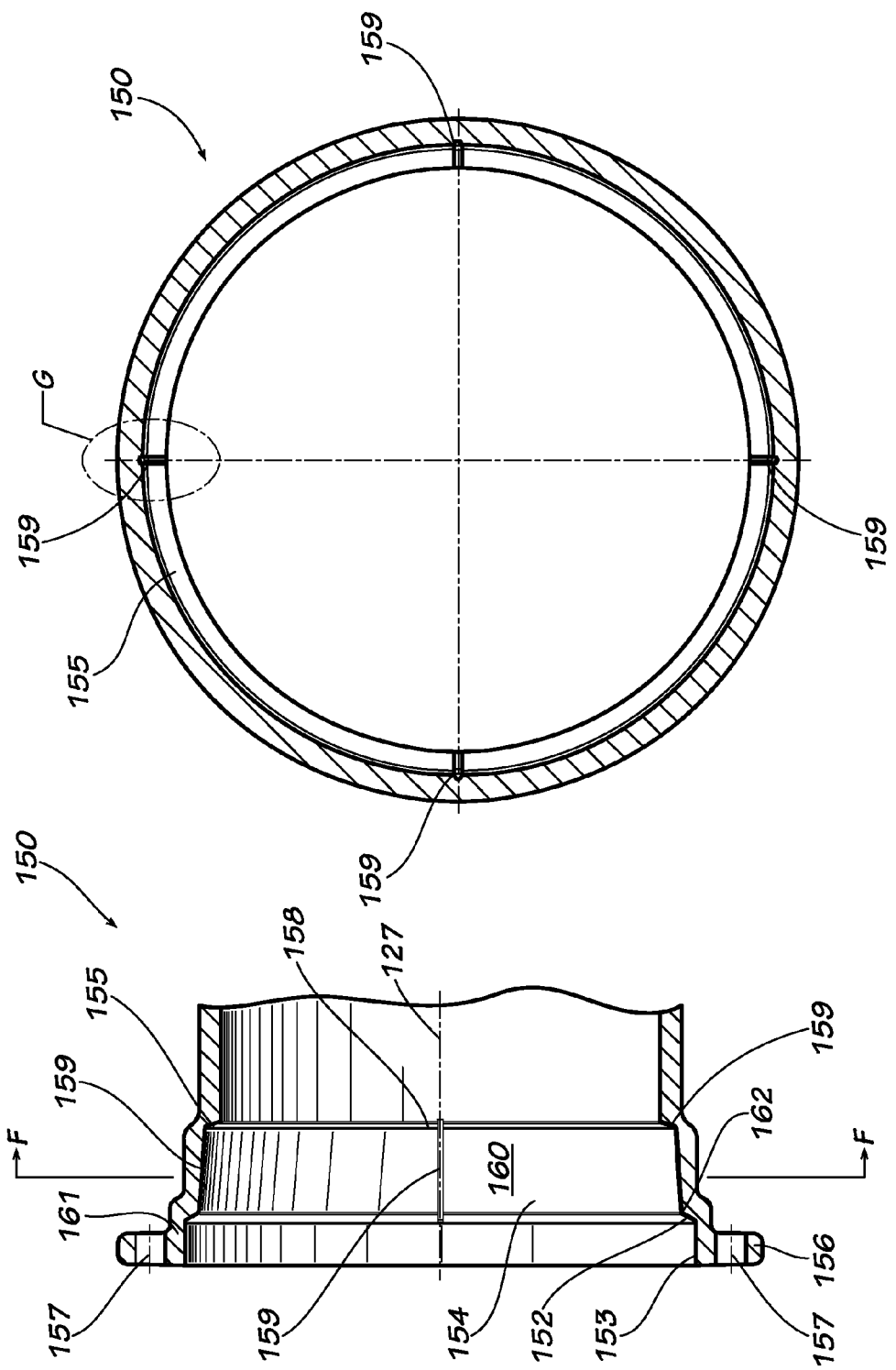

PIPE COUPLING DEVICE

CROSS-REFERENCE TO RELATED APPLICATIONS

This application claims the benefit of U.S. Provisional Application 61/308,549 filed on Feb. 26, 2010, which is hereby incorporated herein in its entirety by reference.

BACKGROUND

The disclosure relates generally to fluid piping members. More particularly, the disclosure relates to the field of connections between lengths of pipe or between pipes and fittings.

The construction of pipelines generally involves the axial connection of two lengths of pipe to form a single pipeline conduit for transporting materials from one point to another. Along the pipeline, one or more fittings may join the pipe pieces to other components in the pipeline. Due to the nature of the materials usually conveyed via pipelines, pipeline conduits, joints between axially-joined pieces of pipe, and joints between pipes and fittings need to be substantially leak-proof.

Another important design requirement exists when it becomes necessary to join the pipe components in a restrained manner. This is usually desired in order to prevent the pipe components from separating due to thrust forces that often occur when the pipeline is subjected to internal pressure or when earth tremors or other external events occur. As such, the overall reliability of the piping system often depends on the stability of the couplings used throughout the system. Accordingly, the pipe industry has focused some attention on the problem of maintaining connections between adjacent lengths of pipe after installation. As a result, several attempted solutions and approaches are known in the art. Accordingly, a number of different arrangements have been developed in an attempt to provide secure couplings between pipe ends. It is known to employ gripping members in order to prevent uncoupling of pipe joints by longitudinal forces imposed on coupled pipe sections. Other arrangements include combinations of rings and seals that use compression-type connections to hold pipe systems together. For example, a gland and gripping ring may be used in combination to position, compress, and seal a gasket on a pipe.

References to "pipe" with respect to the application or use of embodiments of the present disclosure shall be understood to include fittings, connections, and any other appurtenances to pipes.

While the degree of pipe restraint on a coupled joint can be important, it can be equally important that an adequate gasket compression be achieved to ensure a correct seal against leaks in the piping system. Accordingly, typical bolt-type couplings having a gasket to effect sealing and a lock ring to restrain the coupled pipe against pull-out are common in the prior art. In these couplings, a gripping ring is imposed on the pipe, between the lock ring and the gasket, to operationally grip the pipe prior to or simultaneous with compression of the gasket. One drawback of such couplings, however, is that they can result in an undetectable but inadequate gasket seal because the gripping ring often engages the pipe and locks it into place before the seal is properly actuated.

Accordingly, other compression couplings have been designed with various arrangements and parts to prevent gripping ring lock-up prior to compression of the sealing gasket. For example, U.S. Pat. No. 4,070,046 to Felker et al. discloses pipe couplings for both restraining and sealing the pipe ends. One major disadvantage of this design, however, is the timing of the gripping and sealing members' actuation. Because the gripping members engage the pipe ends at very low torque, the follower member becomes locked onto the pipe end with this design. Accordingly, proper gasket compression can only be achieved by ensuring that there is a gap between the pipe ends and that at least one of the pipes is free to move axially into the coupling. These requirements make this design unsuitable for use in certain applications where such pipe movement is not possible. Another problem with this design is that gasket compression may be reduced when the coupled pipe is under an axial tension load because the gripping member supporting the gasket has a tendency to move away from the gasket.

U.S. Pat. No. 4,569,542 to Anderson et al. discloses a bolt-type coupling designed to provide clearance functions, so that gasket compression is achieved before the gripping ring effectively grips the pipe and locks the coupling in place when the bolt fasteners are tightened. U.S. Pat. No. 5,803, 513 to Richardson discloses the use of a plurality of skid pads strategically placed over the teeth of the gripping ring to prevent it from prematurely engaging the pipe before compressing the accompanying gasket. However, while the couplings disclosed by U.S. Pat. Nos. 4,569,542 and 5,803, 513 are useful for their intended purpose, they require additional or complicated arrangements of parts, which may increase cost and/or hinder the ease of coupling installation.

Another partial solution to these problems is proposed in U.S. Pat. No. 4,606,565 to Royston, which provides separate follower members for the gripping and the sealing members. With such a coupling, complete and repeatable gasket compression, as well as complete and repeatable gripping engagement, are possible regardless of installation conditions. While such a coupling solves the problems of gasket compression and gripping engagement, the design requires assembly of a number of pieces and proper tightening of twice as many bolts. Accordingly, the solution proposed in U.S. Pat. No. 4,606,565 overcomes the limitations of the other designs, but, the design increases the number of pieces and causes the installation of the device onto the pipe to be cumbersome and overly time consuming.

Yet another solution to these problems has been described in U.S. Pat. No. 7,004,511 to Barron et al. in which an intermediate ring, located between a sealing gasket and a gripping ring, has a restraining member adapted for restraining the gripping ring to prevent the gripping members from gripping a male piping member until after the sealing gasket is compressed into sealing engagement with the male piping member and a female piping member.

However, the reliability of the sealing arrangement between the female piping member, sealing gasket, and male piping member depends on a uniform distribution of a force compressing the sealing gasket especially in the long term. In order to achieve uniform force distribution, concentric location of the female piping member, male piping member, and coupling device element that compress the sealing gasket is desirable. The prior art does not offer a solution to this problem.

There remains a need for an improved pipe coupling that provides a desired degree of sealing and gripping functions regardless of installation conditions, that is simple to install and manufacture, and that retains an appropriate seal over time. It is to such a pipe coupling that various embodiments of the present disclosure are primarily directed.

DESCRIPTION OF THE FIGURES

FIG. 1 is a side cross-sectional view of a pipe coupling device, known in the art, before the bolts are tightened.

FIG. 2 is a close-up view of detail A of the pipe coupling device, known in the art, shown in FIG. 1.

FIG. 3 is a close-up view of detail B of the pipe coupling device, known in the art, shown in FIG. 1.

FIG. 7 is a side cross-sectional view of a female member of the pipe coupling device of FIG. 5.

FIG. 8 is a sectional view of the female member in the cross-sectional plane indicated by line F in FIG. 7.

DETAILED DESCRIPTION

Figure 4:
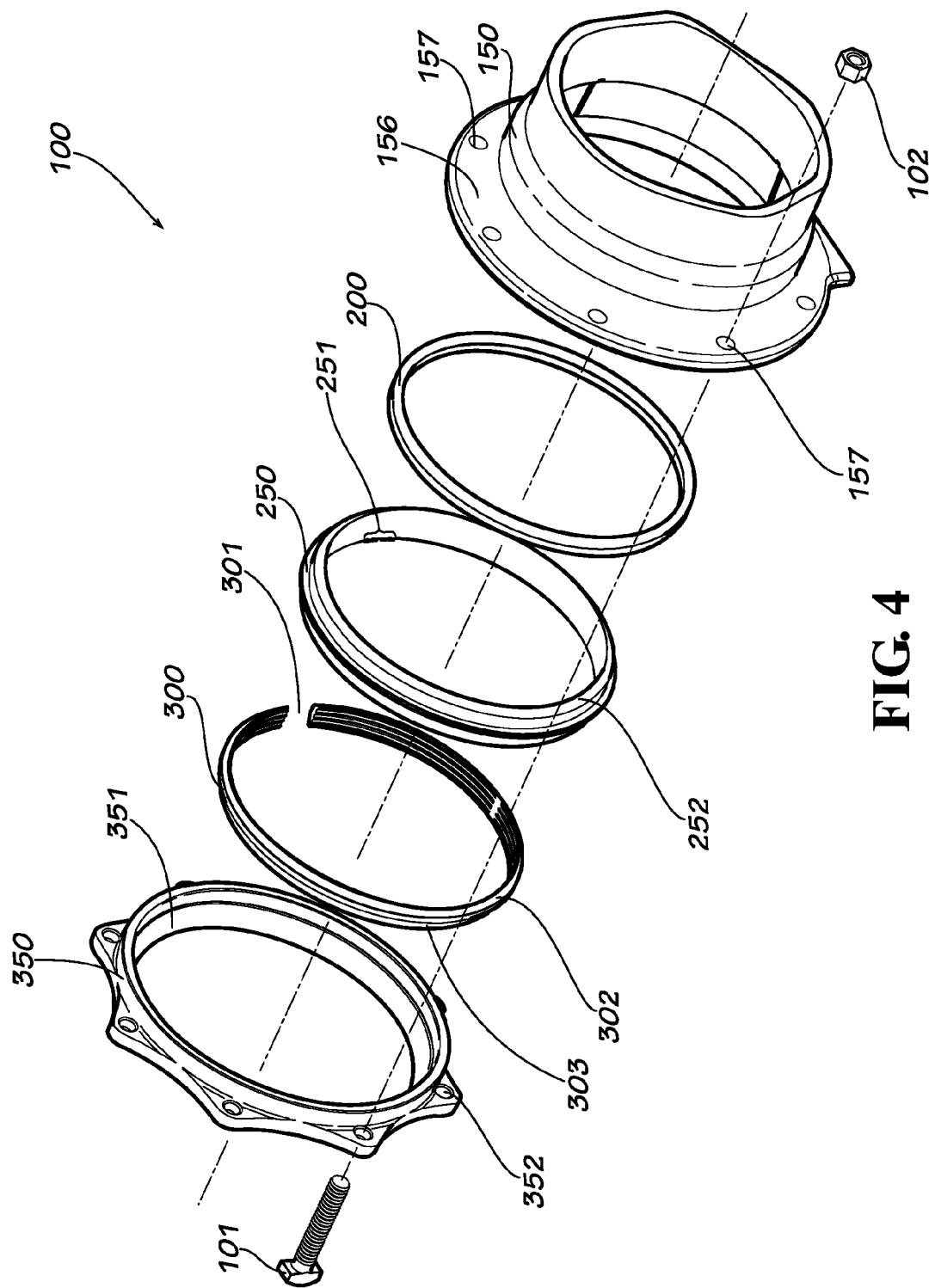
FIG. 4 is an exploded view of a pipe coupling device in accordance with one embodiment of the present disclosure showing the arrangement of sealing elements.

To facilitate an understanding of the principles and features of the present disclosure, it is explained hereinafter with reference to its implementation in an illustrative embodiment. In particular, the present disclosure is described in the context of a pipe coupling device.

Those skilled in the art will understand that the specificity provided herein is intended for illustrative purposes with respect to one of many possible embodiments and is not to be interpreted as limiting the scope of the claims.

Embodiments of the present disclosure will be described primarily in conjunction with a pipe coupling device suitable for round cross-section fluid pipelines. It should be understood, however, that various embodiments can be utilized in conjunction with a variety of other applications, both in fluid pipe conduits and in other types of pipelines. For example, various embodiments may be utilized in conjunction with the gas pipelines and other applications requiring secure, fluid tight connection between adjacent piping conduits having various cross-sectional shapes. In addition, embodiments will be described primarily in the context of connecting female piping sections with male piping sections. However, it should be understood that embodiments may be used with a variety of fluid piping members, including adjoining male and female piping terminal fittings and other pipe fittings having openings configured to receive male piping members. Although an ordering of coupling elements is recited in example embodiments of this disclosure, no particular ordering of elements should be considered binding on the disclosure as a whole, and particular elements may be reordered, repositioned, replaced, or removed entirely from the assembly. Such modifications are to be considered to be captured by the present disclosure. Although the disclosure refers to diameters, the piping members in this arrangement may be non-circular in profile. Where a diameter is recited, the outer dimension of elements is intended to be referenced for non-circular elements.

Referring now in detail to the drawing figures, wherein like reference numerals represent like parts throughout the several views, FIGS. 1-3 illustrate the side cross-sectional view and the close-up views of the details of the pipe coupling device as it is known in the art, particularly, as described in U.S. Pat. No. 7,004,511. This pipe coupling device 10 includes a female member or female piping member 11 having an enlarged end portion 12 for receiving a male piping member 13. The enlarged end portion 12 has a sealing cavity 14 defined between an outer surface 15 of the male piping member 13 and an interior surface 16 of the female piping member 11. In addition, the female piping member 11 has a cylindrical area 23 to accommodate an interfacing end 31 of the male piping member 13 which extends longitudinally inward parallel to the pipe axis 24 and joins a shoulder region 25.

A sealing gasket 17 is adapted for arrangement within the sealing cavity 14 of the female piping member 11 for compression into sealing engagement with the outer surface 15 of the male piping member 13. A gripping ring 18 is adapted for encircling the male piping member 13 and has a radial inner surface having a plurality of gripping members 19 for gripping the male piping member 13 upon coaxial compression of the gripping ring 18. An intermediate ring 20 is adapted for encircling the male piping member 13 between the sealing gasket 17 and the gripping ring 18 and has a restraining member (not shown) adapted for restraining the gripping ring 18 to prevent the gripping members 19 from gripping the male piping member 13 until after the sealing gasket 17 is compressed into sealing engagement with the outer surface 15 of the male piping member 13. A locking ring 21 is adapted for communication with the gripping ring 18. At least two tightening members 22 are included for connecting the female piping member 11 and the locking ring 21 to compressibly secure the gripping ring 18 and sealing gasket 17 to the male piping member 13, such that upon the tightening of the tightening members 22, the sealing gasket 17 is compressed into sealing engagement followed by the gripping of the male piping member 13 by the gripping ring 18. When the system is operational, tightening of the tightening members 22 forces the locking ring 21 closer to the female piping member 11. The gripping ring 18 and intermediate ring 20 move together toward the sealing gasket 17, eventually seating the sealing gasket 17 in the sealing cavity 14. After sealing, further tightening of the tightening members 22 causes the gripping ring 18 to break the engagement with the restraining member (not shown) and lock onto the male piping member 13.

As described, the reliability of the sealing arrangement between the female piping member 11, sealing cavity 14, and male piping member 13 depends on a uniform distribution of a force compressing the sealing gasket 17. Thus, a concentric arrangement of parts is desirable.

The parts of the pipe coupling device 10 involved in the sealing arrangement, particularly the cylindrical area 23 of the female piping member 11, the intermediate ring 20, and the gripping ring 18, can be developed in at least two different ways: they can be finished by machining or used "as cast." Machining may deliver parts with a narrower field of tolerances and produce more concentric location of all parts involved in the sealing arrangement. However, the machining of all the parts is time-consuming and costly.

On the other hand, less costly "as-cast" parts have much wider fields of tolerances, which widen further with an increase in the diameter of the pipe to be coupled. Large casting tolerances can result in non-concentric assembly of the male piping member 13 and the female piping member 11. In particular, during field assembly, when the male piping member 13 is inserted into the female piping member 11, the difference between an outside diameter of the male piping member 13 and an inside diameter of the cylindrical area 23 of the female piping member 11 can allow displacement of the male piping member 13 and can allow the outer surface 15 of the male piping member 13 to contact an inner surface 26 of the cylindrical area 23 (see FIGS. 2 and 3) such that the interfacing end 31 of the male piping member 13 moves within the cylindrical area 23 so that the axis 24 of the male piping member 13 is not coaxial with the female piping member 11, creating a circumferentially non-uniform space between the male piping member 13 and the cylindrical area 23, leading to improper seal between the male piping member 13, the female piping member 11, and the sealing gasket 17 (as seen in FIGS. 1-3). Depending on cast tolerances, the intermediate ring 20 may drop until an inner surface 27 of the intermediate ring 20 approaches the outer surface 15 of the male piping member 13 (as seen in FIG. 2), potentially contacting it, or the intermediate ring 20 may drop until an outer surface 28 of the intermediate ring 20 approaches the interior surface 16 of the female piping member 11 (as seen in FIG. 3), potentially contacting it. The result is that the mating surfaces of the sealing gasket 17 and of the intermediate ring 20 are eccentric and produce non-uniform loading of the sealing gasket 17. The effect of these factors can breach the sealing arrangement between the male piping member 13, sealing gasket 17, and female piping member 11, especially in the long term. Also, even if machined, the sealing elements can become off-centered around piping with wider tolerances than the sealing elements and lead to the incomplete sealing engagement described above.

Figure 5:
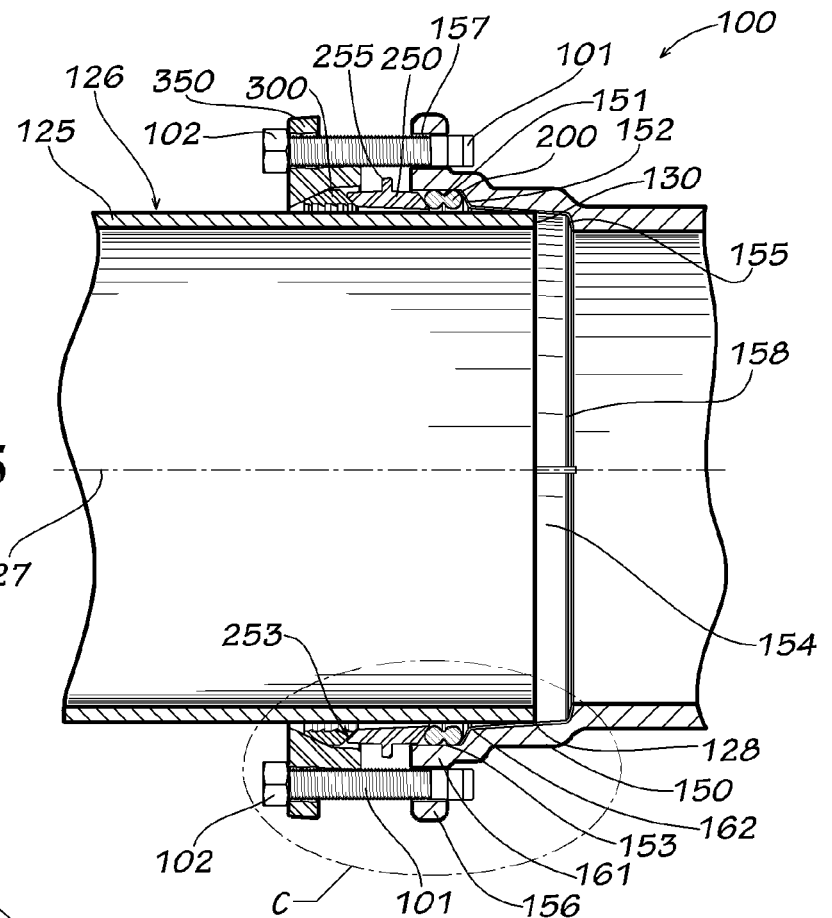
FIG. 5 is a side cross-sectional view of the assembled pipe coupling device of FIG. 4 including a male pipe before the tightening members are tightened.
Figure 10:
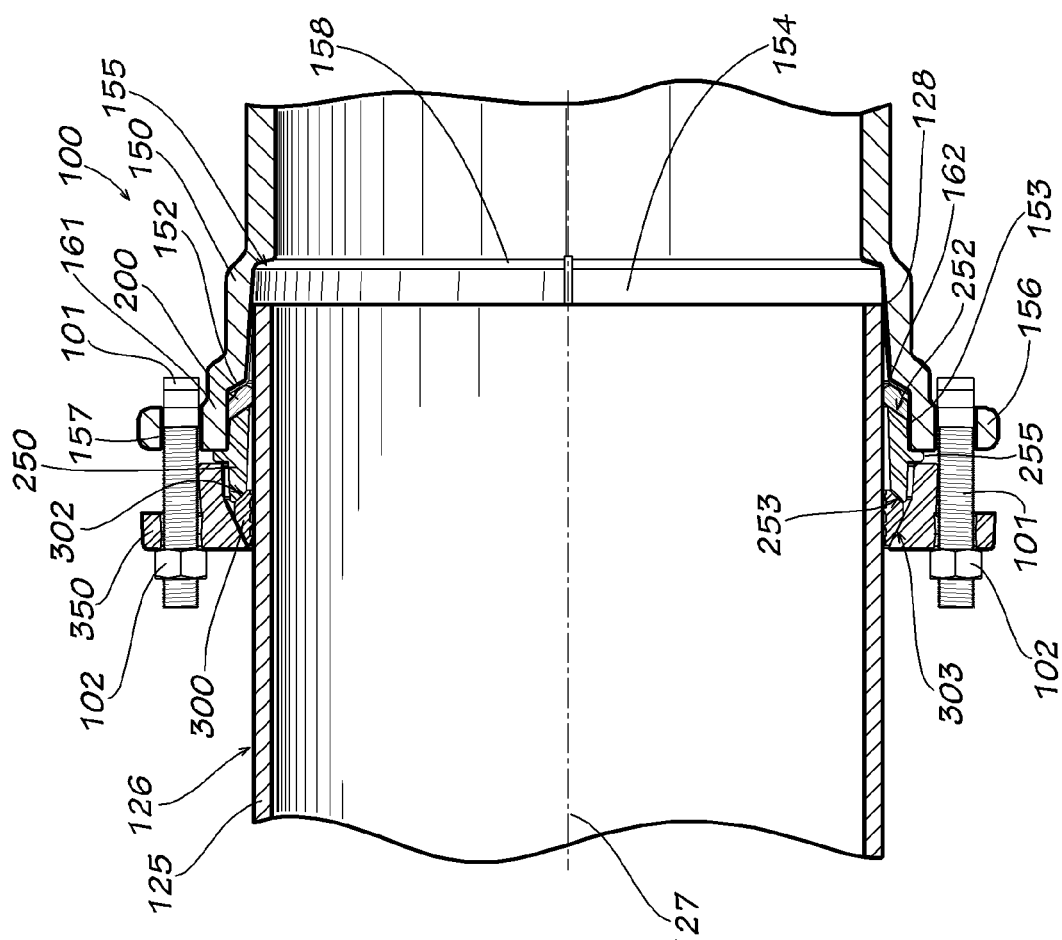
FIG. 10 is a side cross-sectional view of the assembled pipe coupling device in accordance with one embodiment of the present disclosure after the tightening members are tightened.
Figure 9:
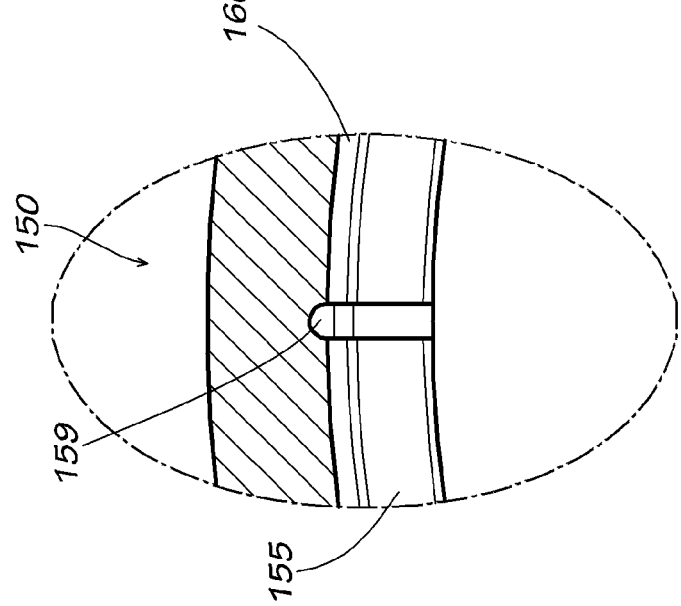
FIG. 9 is a close-up view of detail G of the female member, shown in FIG. 8.
Figure 11:
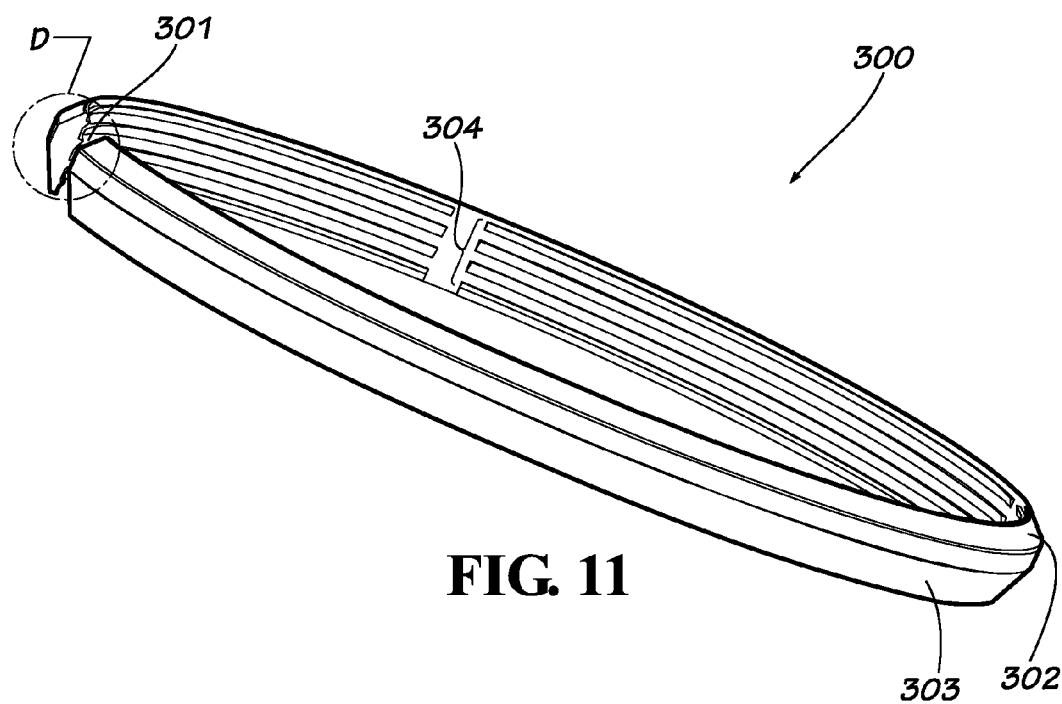
FIG. 11 is a perspective view of a gripping ring of the pipe coupling device of FIG. 4.
Figure 12:
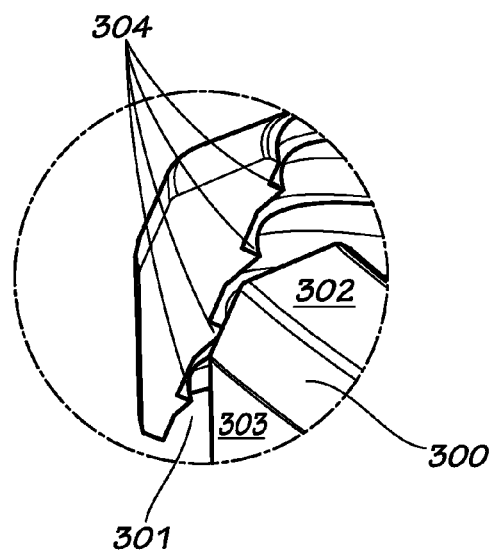
FIG. 12 is a close-up view of detail D of the gripping ring, shown in FIG. 11.

FIGS. 4 through 16 illustrate an embodiment of a coupling device 100. More specifically, FIG. 4 presents an exploded view of the coupling device 100, and FIG. 5 illustrates the side cross-sectional view of the coupling device 100 in a first position, wherein tightening members 101 have not been tightened. A female piping member 150 and a locking ring 350 cooperate with sealing elements (a gripping ring 300, an intermediate ring 250, and a sealing gasket 200) to form a fluid-tight seal on a male piping member 125 as shown in FIG. 10. In various embodiments, the female piping member 150 may be a piping, a fitting, a coupling, a joint, another piping element, or a portion of any of the foregoing.

The arrangement of the sealing elements is illustrated in the exploded view of FIG. 4. As shown, the gripping ring 300 is positioned adjacent to the locking ring 350, and the intermediate ring 250 is positioned between the gripping ring 300 and the sealing gasket 200. In operation, the sealing elements abut one another to compress the sealing gasket 200, forming a fluid tight seal between the male piping member 125 and the female piping member 150 as described below. The intermediate ring 250 may include one or more restraining members 251 (see FIGS. 13 and 14) that communicate with a slot 301 on the gripping ring 300 (see FIGS. 4, 11 and 12) and prevent the gripping ring 300 from engaging an outer surface 126 of the male piping member 125 until after the sealing gasket 200 has been compressed. Although the restraining member 251 is placed on the intermediate ring 250 in the current embodiment, the restraining member may be included on or integrated with the locking ring 350 or the gripping ring 300.

Figure 6:
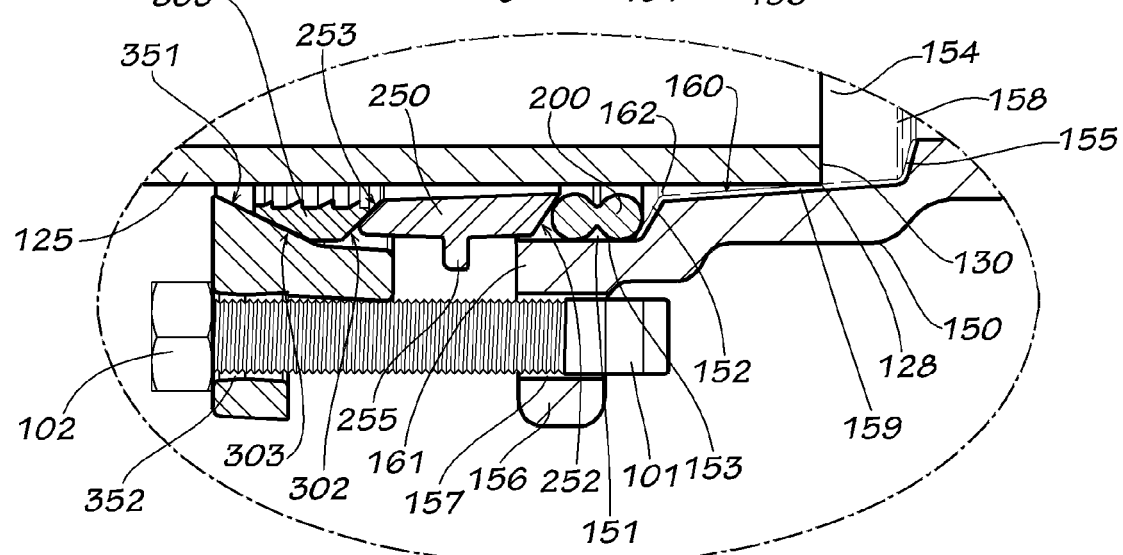
FIG. 6 is a close-up view of detail C of the pipe coupling device, shown in FIG. 5.

As shown in FIGS. 5-7, the female piping member 150 includes a front wall 152 and a retaining wall 153 on an enlarged end portion 161 of the female piping member. Along with the male piping member 125 and the intermediate ring 250, the front wall 152 and retaining wall 153 of the female piping member 150 create a sealing cavity 151 around the male piping member 125 for placement of the sealing gasket 200. In addition, the female piping member 150 has a cone-shaped portion 154 which joins a shoulder region 155 (see FIG. 7). The cone-shaped portion 154 is a region of the female piping member 150 with an opening diameter or width initially larger than the outer diameter or width of the male piping member 125 wherein the opening diameter or width gradually reduces radially along the length of the female piping member 150 and wherein the gradual reduction in diameter or width terminates at an opening diameter or width that is smaller than the outer diameter or width of the male piping member 125. The cone-shaped portion 154 has a larger end 162 and a smaller end 158. The cone-shaped portion 154 is dimensioned so that the largest possible diameter of the smaller end 158 of the cone-shaped portion 154 is not larger than the smallest possible diameter of an engagement end 130 of the male piping member 125. This arrangement allows for the engagement end 130 of the male piping member 125 to be centrally located with respect to the female piping member 150 without any dependency on the outside diameter of the male piping member 125 or the cast tolerances of the female piping member 150 and substantially ensures a uniform sealing cavity 151 about the male piping member 125. Although the cone-shaped portion 154 of the female piping member 150 is defined as a cone in the current embodiment, any reducing diameter profile may serve the same purpose and is intended to be included within the definition of the cone-shaped portion 154.

The female piping member 150 also may have a flange 156, which may include a plurality of apertures 157 to receive the tightening members 101 as it will be described below. In addition, the female piping member 150 may also have at least one media channel 159 (see FIGS. 6-9) for delivering media pressure to the back of the sealing gasket 200 to increase its compression. The cross-sectional profile of each at least one media channel 159 is semi-circular in the current embodiment (see FIG. 9), although other cross-sectional profiles are contemplated by this disclosure.

The sealing gasket 200 may be in the form of a variety of different cross-sectional shapes. For instance, the sealing gasket 200 may have a cross-sectional shape that matches the shape of the sealing cavity 151 of the female piping member 150. The sealing gasket 200 may also be a simple O-ring. In various embodiments, the sealing gasket 200 has a "filled figure-8" cross-sectional shape (see FIG. 6). In various other embodiments, two O-rings or other gaskets with the same or similar cross-sectional shapes may also be used. The sealing gasket 200 is designed to be compressible and is made from rubber, elastomer, silicone, or other compressible sealing material.

As seen in FIG. 6, to improve the compression of the sealing gasket 200, a gasket mating surface 252 of the intermediate ring 250 that mates with the sealing gasket 200 is substantially slanted to the same degree as the front wall 152 of the sealing cavity 151 of the female piping member 150. When nuts 102 are tightened on the end of the tightening members 101, the sealing gasket 200 is compressed between the gasket mating surface 252 of the intermediate ring 250 and the front wall 152. Through the compression, the gasket mating surface 252 radially forces a portion of the sealing gasket 200 toward the retaining wall 153 while the front wall 152 radially forces another portion of the sealing gasket 200 toward the male piping member 125. Thus, once the sealing gasket 200 is compressed between the gasket mating surface 252 and the front wall 152, the radial arrangement of the sealing gasket 200 will substantially assure a leak proof seal.

In various embodiments, the end of the intermediate ring 250 opposite to the gasket mating surface 252 has an overlapping surface 253 to provide a stable engagement with an intermediate-ring-side overlapping surface 302 positioned on the side of the gripping ring 300 that interfaces with the intermediate ring 250. In the current embodiment, the intermediate-ring-side overlapping surface 302 of the gripping ring 300 is an outer cone-shaped surface. The overlapping surface 253 of the intermediate ring 250 is an inner cone-shaped surface. Other overlapping profiles are contemplated by this disclosure.

Figure 13:
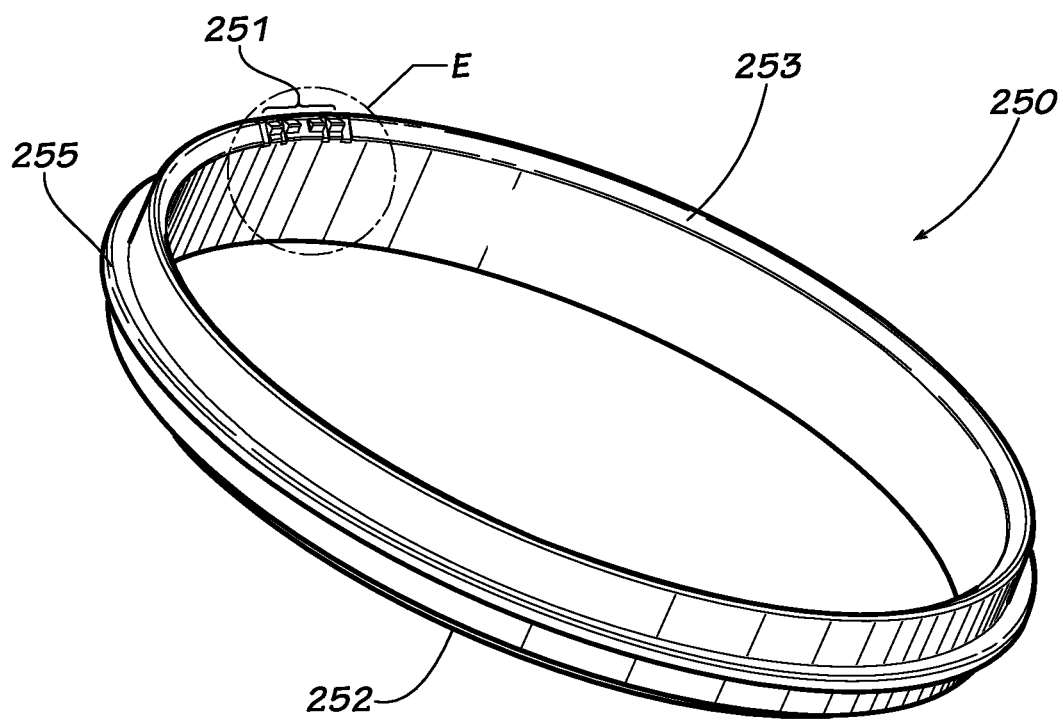
FIG. 13 is a perspective view of an intermediate ring of the pipe coupling device of FIG. 4.
Figure 14:
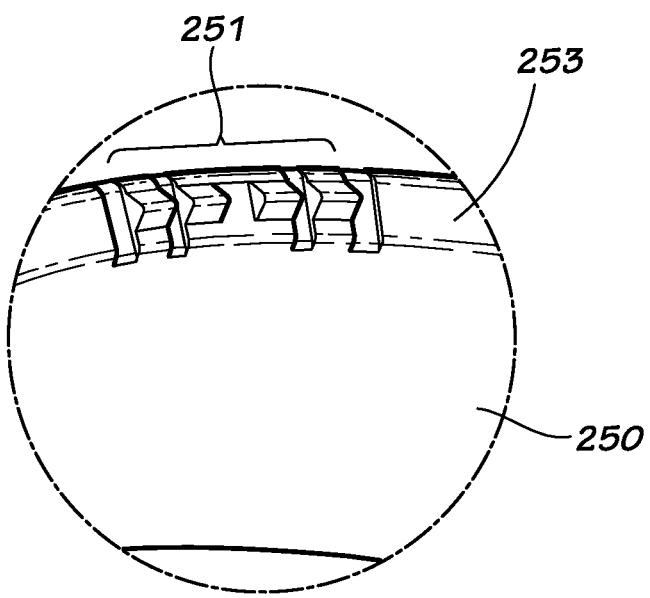
FIG. 14 is a close-up view of detail E of the intermediate ring, shown in FIG. 13.
Figure 15:
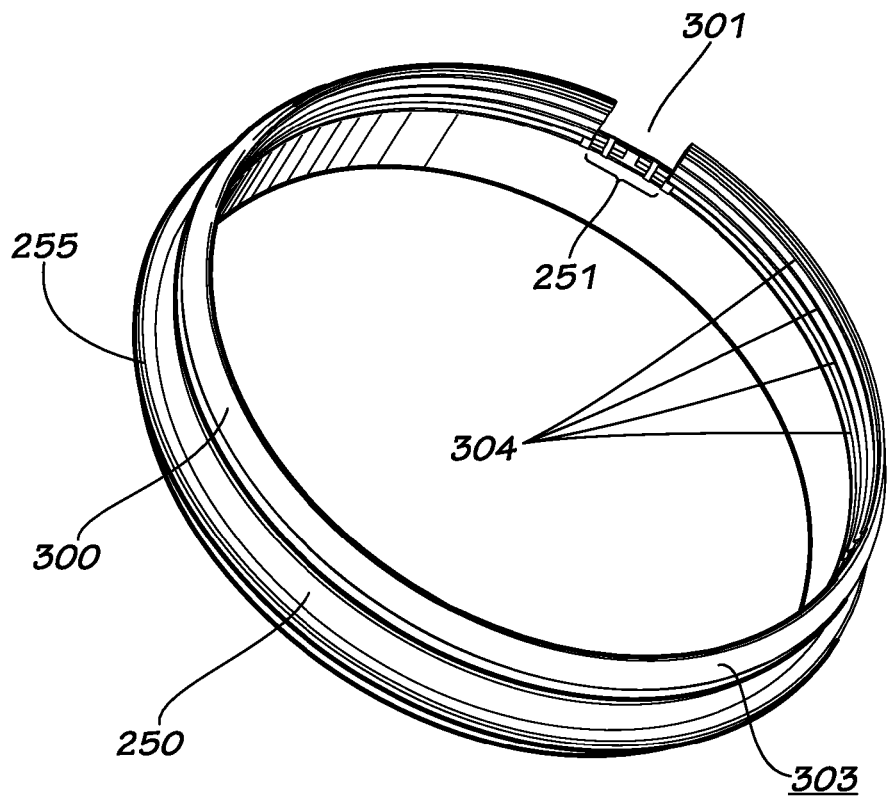
FIG. 15 is a perspective view of the gripping ring and the intermediate ring of the pipe coupling device of FIG. 4, wherein the gripping ring is in contact with the restraining member of the intermediate ring.

The intermediate ring 250 may further include at least one restraining member 251 (see FIGS. 13-15) to prevent the gripping ring 300 from engaging the male piping member 125 and locking the coupling in place until a proper seal has been achieved. The restraining member 251 may be carried as a separate component, may be integral with the intermediate ring 250 (as shown in the current embodiment) or the locking ring 350, or may be integral with the gripping ring 300. The restraining member 251 is aligned with the slot 301 of the gripping ring 300 for positioning within the slot 301 during compression. The restraining member 251 has a predetermined retention force for preventing radial inward movement of the gripping ring 300 until sufficient force is applied to disengage the restraining member 251. The force required to compress the slot 301 from its first position (see FIG. 15) to its second position (see FIG. 16) by disengaging the restraining member 251 is greater than the force required to compress the sealing gasket 200. A radial inner surface of the gripping ring 300 further may include a plurality of gripping members 304 (see FIGS. 11 and 12) extending radially inwardly and adapted to engage the outer surface 126 of the male piping member 125 upon coaxial compression of the gripping ring 300. In the current embodiment, the gripping members 304 are teeth, although other types of gripping members are contemplated within this disclosure. When the gripping ring 300 moves from its first position to its second position, the gripping members 304 move into a gripping engagement with the male piping member 125 and thereby secure the coupling device 100 in the second position of FIG. 16. The restraining member 251 may be at least one break-off member as shown in FIGS. 13-15 or at least one deformable member designed to bend or crush rather than break off.

The longitudinally extending slot 301 of the gripping ring 300 has a predetermined width to accommodate reduction of the circumference of the gripping ring 300 upon coaxial compression of the gripping ring 300 by the radial interior of the locking ring 350 due to an interaction between an overlapping surface 351 of the locking ring 350 and a locking-ring-side overlapping surface 303 of the gripping ring 300. The locking-ring-side overlapping surface 303 of the gripping ring 300 and the intermediate-ring-side overlapping surface 302 of the gripping ring 300 are shown as outer cone-shaped surfaces in the current embodiment. The overlapping surface 351 of the locking ring is shown as an inner cone-shaped surface in the current embodiment.

In various embodiments, each of the gripping members 304 of the gripping ring 300 may be provided with a radially extending surface and an angled backup surface which meet to form an inner edge. Accordingly, the width of the slot 301 of the gripping ring 300 may be compressed from a first position (see FIG. 15), where the gripping members 304 of the gripping ring 300 do not grip the male piping member 125, to a second position (see FIG. 16), where the slot 301 has a smaller width and the gripping members 304 of the gripping ring 300 engage or grip the outer surface 126 of the male piping member 125.

The coupling device 100 includes the locking ring 350 that surrounds and abuts the gripping ring 300, which is in communication with the intermediate ring 250. The intermediate ring 250 abuts the sealing gasket 200. The sealing gasket 200 abuts the slanting front wall 152 of the female piping member 150. The locking ring 350 may have two or more apertures 352 for receiving the tightening members 101 so that the bolts will each extend through the aperture 352 and through the aperture 157 in the flange 156 of the female piping member 150. In various embodiments, the tightening members 101 may have an anchoring portion or catch (not shown) opposite the threaded end to facilitate engagement between the locking ring 350 and the flange 156 of the female piping member 150 as the nuts 102 are tightened. With this arrangement, tightening the nuts 102 on the threaded ends of the tightening members 101 secures the sealing elements together and assures a fluid tight seal. Although not described in the current embodiment, other tightening means are contemplated by this disclosure.

FIG. 5 shows the coupling device 100 prior to the tightening of the nuts 102. The portion of the gripping ring 300 defining the slot 301 is in contact with the restraining members 251, preventing the gripping ring 300 from radially contracting and engaging the outer surface 126 of the male piping member 125. In FIG. 5, the slot 301 is in the first position (see FIG. 15) and the sealing gasket 200 is not compressed. Upon tightening the nuts 102 on the tightening members 101, the gripping ring 300 and the intermediate ring 250 will advance in the direction of the sealing gasket 200 and eventually compress it.

Figure 16:
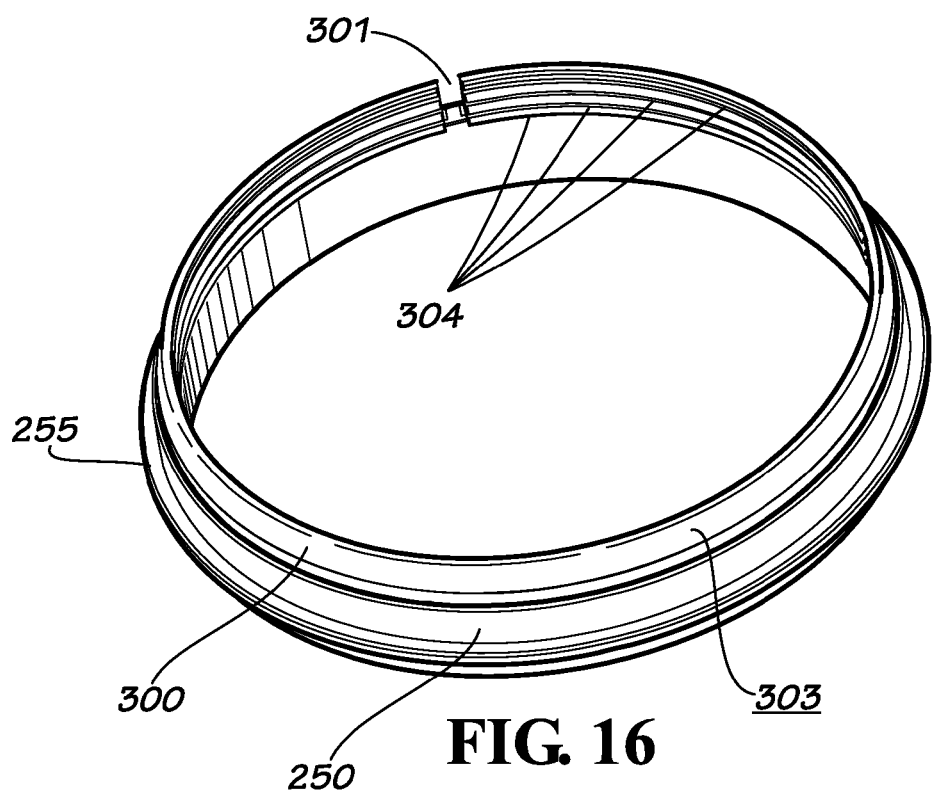
FIG. 16 is a perspective view of the gripping ring and intermediate ring shown in FIG. 15 after the restraining member of the intermediate ring has been disengaged by the gripping ring.

As the nuts 102 are further tightened, additional force is transferred to the gripping ring 300. This additional force increases the force exerted by the gripping ring 300 at the slot 301 on the restraining members 251 because the sealing gasket 200 is already compressed. Once sufficient force is applied to the restraining members 251, at least one of the restraining members 251 deforms or dislocates from the intermediate ring 250, which decreases the width of the slot 301 (see FIG. 16), and allows the gripping ring 300 to engage the outer surface 126 of the male piping member 125 as exhibited by FIG. 10, which shows the tightened assembly of the coupling device 100. It should be noted that, although FIG. 16 shows that all of the restraining members 251 have been dislocated from the intermediate ring 250, allowing the slot 301 to be compressed to a narrower width, the degree of compression of the slot 301 varies according to the outer diameter of the male piping member 125 in relation to the inner diameter of gripping ring 300. Accordingly, all of the restraining members 251 need not necessarily dislocate from the intermediate ring 250 before the gripping ring 300 engages the outer surface 126 of the male piping member 125. In various embodiments, the restraining members 251 may be located on the locking ring 350 instead of the intermediate ring 250. The intermediate ring 250 also may optionally include a compression fin 255 (shown in FIG. 13).

As illustrated by FIGS. 5 and 10, from the initial assembly of the coupling device 100 and up to the moment of establishing a tightly sealed connection, the engagement end 130 of the male piping member 125 stays central with respect to the female piping member 150 due to the permanent contact of a front edge 128 of the engagement end 130 of the male piping member 125 with an inner surface 160 of the cone-shaped portion 154 of the female piping member 150 (see FIG. 6).

In addition, because of a permanent interaction between the intermediate-ring-side overlapping surface 302 of the gripping ring 300 and the overlapping surface 253 of the intermediate ring 250, the intermediate ring 250 stays concentric with the gripping ring 300 and the female piping member 150. This arrangement results in uniform pressure applied to the sealing gasket 200 by the intermediate ring 250.

Based on the figures and written description present in both this disclosure and those to which this disclosure claims priority, one of skill in the art would understand that the current configuration of features or elements may be interchanged, combined, or eliminated as necessary. For example, functions performed by the intermediate ring 250 in the current embodiment may be approximated by the gripping ring 300 in another embodiment, making possible the elimination of the intermediate ring 250. This arrangement could include a modified gasket to improve the sealing engagement of the device. In another example, the restraining members 251 configured as portions of the intermediate ring 250 in the current embodiment could be configured as portions of the locking ring 350 in another embodiment.

Numerous characteristics and advantages of various embodiments of the present disclosure have been set forth in the foregoing description, together with details of structure and function. Many modifications, additions, and deletions will be apparent to those skilled in the art that, especially in matters of shape, size, and arrangement of parts, without departing from the spirit and scope of the disclosure and its equivalents as set forth in the following claims. Therefore, other modifications or embodiments as may be suggested by the teachings herein are particularly reserved, especially as they fall within the breadth and scope of the claims here appended.

The invention claimed is:

1. A pipe system comprising:
   a male piping member, the male piping member comprising an outer surface;
   a female piping member to receive the male piping member, the female piping member comprising
      an enlarged end portion dimensioned to surround the male piping member to define a sealing cavity between the enlarged end portion and the outer surface of the male piping member, and
      a cone-shaped portion having a larger end and a smaller end, the larger end intersecting a front wall of the female piping member, the front wall defining a continuous inner cone surface, and the front wall of the female piping member intersecting the enlarged end portion, the smaller end of the cone-shaped portion dimensioned no larger than the male piping member; and
   a coupling device for use with the male piping member and the female piping member, the coupling device comprising
      a compressible sealing gasket arranged within the sealing cavity,
      a gripping ring dimensioned to surround the male piping member, the gripping ring having an inner surface and an outer surface, the inner surface including at least one gripping member and the outer surface including at least one overlapping surface,
      an intermediate ring dimensioned to surround the male piping member, a first edge of the intermediate ring comprising an overlapping surface facing at least partially radially inward and being in communication with and at least partially overlapping the at least one overlapping surface of the gripping ring, a second edge of the intermediate ring comprising a gasket mating surface in communication with the compressible sealing gasket, and
      a locking ring dimensioned to surround the male piping member and to communicate with the gripping ring, the locking ring also including an overlapping surface, wherein through a tightening connection between the locking ring and the female piping member, the locking ring communicates with the gripping ring to force the intermediate ring into the compressible sealing gasket to form a seal between the male piping member and the female piping member and to subsequently force the gripping ring to grip the male piping member.

2. The pipe system of claim 1, wherein the male piping member includes an outer width dimension, and wherein the smaller end of the cone-shaped portion includes an inner width dimension, wherein the largest possible inner width dimension of the smaller end of the cone-shaped portion is no larger than the smallest possible outer width dimension of the male piping member.

* * * * *